INVENTORS: M.R. AARON
V. I. JOHANNES
J. S. MAYO
R.H. MC CULLOUGH
J.M. SIPRESS
BY Leonard M. Arnold
ATTORNEY March 24, 1970 M. R. AARON ET AL 3,502,810

BIPOLAR PULSE TRANSMISSION SYSTEM WITH SELF-DERIVED TIMING AND DRIFT COMPENSATION

Filed Aug. 15, 1966 6 Sheets-Sheet 2

March 24, 1970 M. R. AARON ET AL 3,502,810

BIPOLAR PULSE TRANSMISSION SYSTEM WITH SELF-DERIVED TIMING AND DRIFT COMPENSATION

Filed Aug. 15, 1966 6 Sheets-Sheet 3

March 24, 1970 M. R. AARON ET AL 3,502,810

BIPOLAR PULSE TRANSMISSION SYSTEM WITH SELF-DERIVED TIMING AND DRIFT COMPENSATION

Filed Aug. 15, 1966 6 Sheets-Sheet 4

March 24, 1970 M. R. AARON ET AL 3,502,810

BIPOLAR PULSE TRANSMISSION SYSTEM WITH SELF-DERIVED TIMING AND DRIFT COMPENSATION

Filed Aug. 15, 1966 6 Sheets-Sheet 5

United States Patent Office 3,502,810
Patented Mar. 24, 1970

3,502,810

BIPOLAR PULSE TRANSMISSION SYSTEM WITH SELF-DERIVED TIMING AND DRIFT COMPENSATION

Marvin R. Aaron, Fair Haven, Virgil I. Johannes and John S. Mayo, Holmdel, Richard H. McCullough, Summit, and Jack M. Sipress, Holmdel, N.J., assignors to Bell Telephone Laboratories, Incorporated, Murray Hill and Berkeley Heights, N.J., a corporation of New York Filed Aug. 15, 1966, Ser. No. 572,464
Int. Cl. H04l *15/00;* H04b *1/04*
U.S. Cl. 178—68 7 Claims

ABSTRACT OF THE DISCLOSURE

Apparatus for encoding binary pulse signals wherein each binary pulse is transmitted as a pulse opposite in polarity to the immediately preceding pulse and "0's" or spaces are encoded as "0's." When the message requires a number of consecutive "0's" exceeding a predetermined number to be encoded, they are not encoded as "0's" but are, rather, replaced by a predetermined bipolar word which results in a violation of the bipolar code. Because the replacement word is a violation (i.e., does not conform to the rules) of the conventional bipolar code, it is easily detected at the receiving terminal and is replaced in the reproduced signal by a train of "0's." The replacement bipolar pulse words are such that the transmitted signal has no direct current component thereby facilitating regeneration.

This invention relates to the transmission of information by pulse techniques and more particularly to such transmission in pulse code modulation systems utilizing regenerative pulse amplifiers.

One of the advantages of transmission by pulse code modulation is that the pulse train may be regenerated at a repeater station before the pulses have been degraded by noise or apparatus defects to a point where they can no longer be reliably decoded. After such regeneration the pulses are again clean and sharp and such regeneration can be repeated as required at repeater points between a transmitter station and a receiver station. In carrying out such regeneration it is desirable that the current or voltage amplitudes of the pulses and spaces not sag toward the average pulse amplitude and to avoid such sag special pulse trains have been employed. One such pulse train is the bipolar pulse train disclosed in U.S. Patent 2,996,578 which issued to F. T. Andrews, Jr. on Aug. 15, 1961. There each binary "0," or space, is transmitted as the absence of a pulse and each binary pulse, or "1" is transmitted as a pulse opposite in polarity to the preceding pulse. Because each successive pulse is of opposite polarity the resulting pulse train is inherently free of drift.

A further problem arises from the fact that in many pulse transmission systems the repeaters are self-timed in the sense that they derive a timing signal, to govern the regeneration of the transmitted signal, from the transmitted signal itself. As a practical matter it has been found that in order to derive such a timing signal from the transmitted signal in an economically feasible system at least one pulse, whether it be a positive going pulse or a negative going pulse, must be received in every interval of approximately fifteen time slots. In the pulse transmission system described in the above mentioned patent it is quite possible that a pulse may not be transmitted at least once every fifteen time slots since each binary "0" is transmitted as the absence of a pulse. Thus, a train of binary "0's," longer in duration than fifteen time slots, is transmitted as the absence of pulses and timing information is then lost.

Several attempts to eliminate or reduce the tendency of the center line of an irregular pulse train to wander or drift while at the same time eliminating the possibility of losing timing information due to the transmission of a long train of "0's" or spaces are disclosed in copending applications Ser. No. 335,014, filed on Jan. 2, 1964, now U.S. Patent No. 3,302,193, by J. M. Sipress, and Ser. No. 417,863, filed on Dec. 14, 1964 by I. Dorros, now U.S. Patent No. 3,369,229, both of these applications being assigned to the present assignee. In the former application a binary pulse signal is converted into a three state signal of positive pulses, negative pulses, and spaces in accordance with a first predetermined code set until a three state signal is generated having a first predetermined direct current component whereupon the conversion is accomplished in accordance with a second predetermined code set until a three state signal having a second predetermined direct current component is generated and the conversion again carried out in accordance with the first code. While the code sets employed insure that the three state signal has no direct current component and that a long train of spaces will not be transmitted, the resulting apparatus is relatively complicated. The latter of the above mentioned copending applications employs multilevel code sets to accomplish similar results as well as reducing the bandwidth requirements of the transmission medium.

While generally satisfactory, the techniques employed in the above identified applications are relatively complex and employ relatively expensive apparatus.

It is an object of this invention to reduce the cost and complexity of apparatus necessary to reduce the tendency of the center line of a pulse train to wander while at the same time eliminating the possibility of losing timing information due to the transmission of a long train of "0's" or spaces.

In accordance with this invention unipolar pulse signals are encoded in accordance with the conventional bipolar pulse code wherein each pulse is transmitted as a pulse opposite in polarity to the immediately preceding pulse and "0's," or spaces, are encoded as "0's." When the message requires a number of consecutive "0's" exceeding a predetermined number to be encoded, they are not encoded as "0's" but are, rather, replaced by a predetermined bipolar word which results in a violation of the bipolar code. Because the replacement word is a violation (i.e., does not conform to the rules) of the conventional bipolar code, it is easily detected at the receiving terminal and is replaced in the reproduced signal by a train of "0's." The replacement bipolar pulse words are such that the transmitted signal has no direct current component thereby facilitating regeneration.

BRIEF DESCRIPTION OF THE DRAWINGS

This invention will be more fully comprehended from the following detailed description taken in conjunction with the drawings in which.

Figure 1:
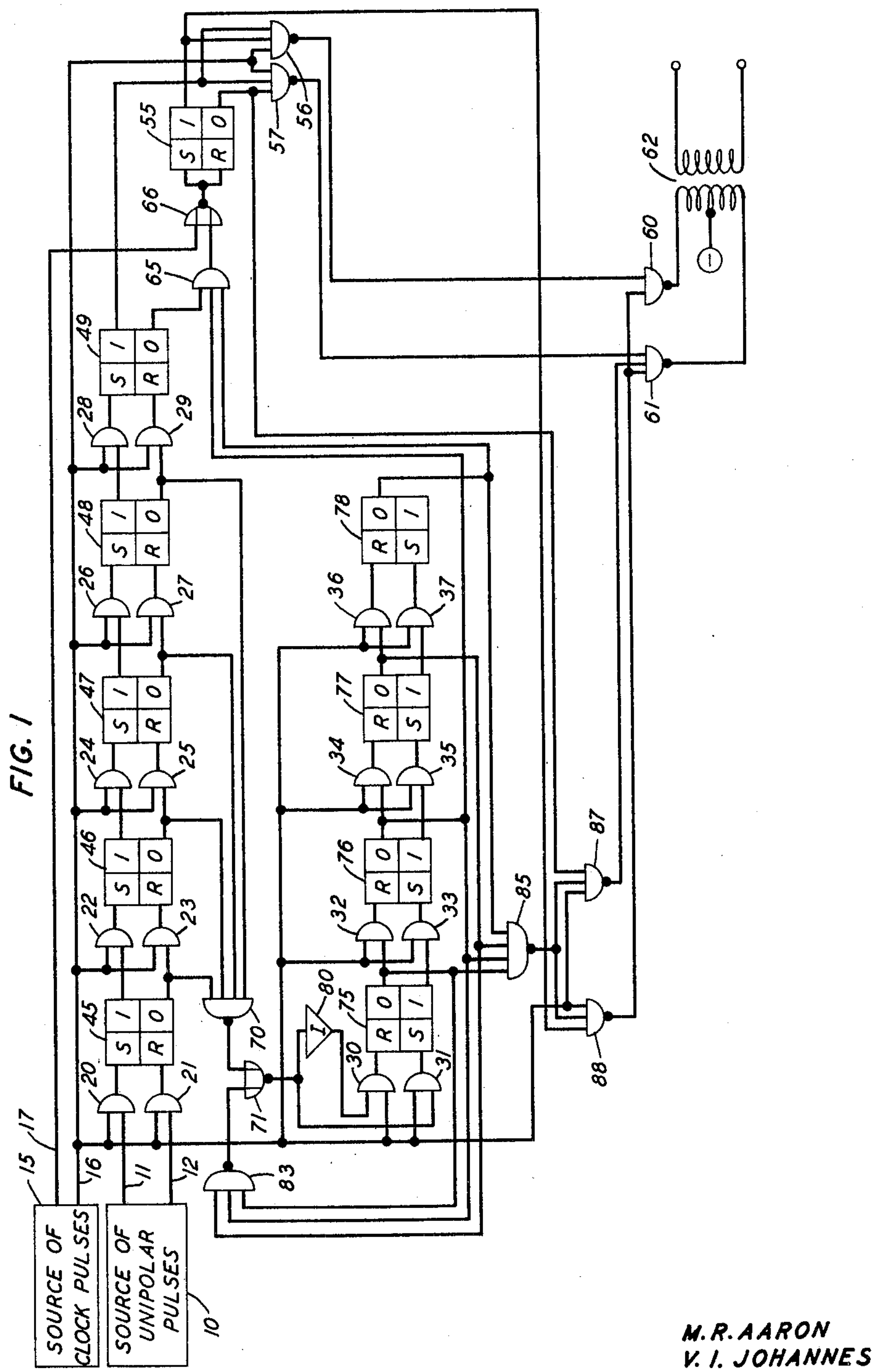
FIG. 1 is a block diagram of encoding apparatus embodying the invention.

Although the symbolic diagrams employed in the drawings are fairly conventional, they will first be described briefly. An AND gate has a plurality of input leads but produces an output only when all input leads are simultaneously enabled. An OR gate has a plurality of input leads but produces an output when any one or more of its input leads is enabled. The somewhat less familiar AND-NOT gate has a plurality of input leads and produces an output signal except when input signals are simultaneously present at all input terminals. A logic table for an AND-NOT gate having two input terminals, A and B, and an output terminal, X is

| A | B | X |
|---|---|---|
| 1 | 1 | 0 |
| 1 | 0 | 1 |
| 0 | 1 | 1 |
| 0 | 0 | 1 |

where "1" indicates the presence of a pulse signal and "0" indicates the absence of a pulse signal. Conversely, the OR-NOT gate produces no output signal, or a space, or "0," except when there are no input signals present at any of the input terminals. Thus the logic diagram of an OR-NOT gate having two input terminals, A and B, and an output terminal, X, is

| A | B | X |
|---|---|---|
| 1 | 1 | 0 |
| 1 | 0 | 0 |
| 0 | 1 | 0 |
| 0 | 0 | 1 |

where the same nomenclature is used as above.

FIG. 1 is a logic diagram of encoding apparatus embodying this invention for converting unipolar pulses into bipolar pulses in which each pulse is transmitted as a pulse opposite in polarity to the immediately preceding pulse and each "0" or space, is transmitted as a zero, but the number of consecutive "0's" is limited to a maximum of three. In accordance with this invention, when the number of consecutive "0's" reaches four one of two special bipolar words is transmitted in their place depending upon the polarity of the last pulse transmitted. When the last pulse transmitted prior to the occurrence of the four consecutive "0's" was a negative going pulse then the bipolar word "++−−" is transmitted in place of the four "0's" where the "+" indicates a positive going pulse and the "−" indicates a negative going pulse. Similarly, when the last pulse was a positive going pulse then the bipolar word "−−++" is substituted for the four "0's." When eight consecutive "0's" occur the first four are replaced in accordance with the above rules and the second group of four consecutive "0's" is replaced by the same bipolar word as the first group. The transmission of the bipolar pulse words is similarly treated for larger numbers of consecutive "0's."

In the diagram of FIG. 1, a source of unipolar pulses 10 representing signals to be transmitted has two output terminals 11 and 12 at which complementary signals are present. These pulse signals commonly called bits occur at regular recurring pulse intervals which are called time slots. Thus, when a pulse is generated in accordance with unipolar encoding, a pulse or "1" is present at output terminal 11 and a space or "0" is present at output terminal 12. Conversely, when a "0" is generated, a pulse or "1" is present at output terminal 12 and a "0" at output terminal 11. The function of the remaining apparatus shown in FIG. 1 is to transform the signals present at terminal 11 for bipolar pulse transmission following the above described coding rules in accordance with the invention. The signals present at terminal 12 are used for control purposes in accomplishing that result.

The operation of apparatus shown in FIG. 1 is governed by signals from a source of clock pulses 15 at whose output terminals 16 and 17 a pulse, or "1," and a space, or "0," respectively appear during each time slot of the transmission system. Output terminal 16 is connected to the first input of each of a series of AND gates 20 through 37 which are thereby enabled during the occurrence of each time slot. Output terminal 11 of source 10 is connected to the second input terminal of AND gate 20 while output terminal 12 is connected to the second input terminal of AND gate 21. Thus, depending upon whether a pulse or a space is to be encoded, AND gate 20 or AND gate 21 is enabled during the occurrence of the next clock pulse to set or reset, respectively, a bistable circuit 45 connected to and controlled by these two AND gates. During the occurrence of the succeeding time slot, the state of bistable circuit 45 is transferred through AND gates 22 and 23 to a second bistable circuit 46. This is accomplished by the enabling of AND gates 22 and 23 by the next occurring clock signal so that they transmit signals representative of the state of bistable circuit 45.

Thus, if the first time slot of the unipolar input signal is a pulse, bistable circuit 45 is set by the output signal from AND gate 20, and a reference voltage appears at the "1" output of bistable circuit 45. AND gate 22, when enabled by the next clock pulse then transmits this reference voltage or "1" to set bistable circuit 46 so that it assumes a state identical to that which bistable circuit 45 assumed during the previous time slot. Similarly, if the first unipolar input signal had been a space, AND gate 21 is first enabled to reset bistable circuit 45 so that a reference voltage appears at its "0" output terminal and ground voltage at its "1" output terminal. During the next occurring clock pulse at terminal 16 of source 15 AND gate 22 or AND gate 23 transmits a reference voltage to the set or reset input terminals respectively of bistable circuit 46 so that it assumes the condition which existed in bistable circuit 45 during the preceding time slot.

In similar fashion, each bit of the input signal is transferred from bistable circuit 45 to bistable circuit 46 and then to bistable circuits 47, 48, and 49. Thus, after the occurrence of the first four time slots of the input signal, those bits are stored in bistable circuits 45 through 48, respectively, with the first occurring bit stored in bistable circuit 48, the second in bistable circuit 47, et cetera. Upon the occurrence of the fifth bit of the input signal the previously stored bits are respetively shifted to the next bistable circuit with the first received bit stored in bistable circuit 49 and the last received bit stored in bistable circuit 45.

For purposes of explanation assume initially that four consecutive "0's" were not present in the first five bits of the input signal. These bits are therefore to be encoded in accordance with the conventional bipolar code wherein each pulse is encoded as a pulse opposite in polarity to the immediately preceding pulse and each space is encoded as a space. Initially, bistable circuit 55 which receives signals from binary circuit 49 assumes one or the other of its two stable conditions when the apparatus is turned on. Its "1" output terminal is connected to one input terminal of an AND-NOT gate 56 and its "0" output terminal is connected to one input terminal of an AND-NOT gate 57. These gates each generate an output pulse or "1" at all times except when an input pulse or "1" is present at each of its three input terminals. Since output pulses cannot be present at both the "1" and "0" output terminals of bistable circuit 55 at the same time this means that one of AND-NOT gates 56 or 57 is capable of producing a "0" at any given time while the other is not. A second input terminal of AND-NOT gate 56 and of AND-NOT gate 57 is connected to output terminal 16 of the source of clock pulses 15 while the third input terminal of these AND gates is connected to the "1" output terminal of bistable circuit 49. Thus, when the bit stored in bistable circuit 49 is a "1" and a pulse is produced at output terminal 16, a zero output is produced at either AND-NOT gate 56 or 57. For example, when bistable circuit 55 is in the set condition and a "1" is stored in bistable circuit 49 then AND-NOT gate 56 produces a "0" output while AND-NOT gats 57 produces a "1" output. Conversely, when bistable circuit 55 is in the reset condition AND-NOT gate 57 produces a "0" output signal and AND-NOT gate 56 produces a "1" output signal.

When AND-NOT gate 56 produces a "0" output, this output is inverted by an AND-NOT gate 60 which produces a "1" output whenever a "0" is applied to one of its two input terminals. Similarly, AND-NOT gate 61, which is connected to the output of AND-NOT gate 57 produces a "1" or pulse output signal whenever AND-NOT gate 57 produces a "0" output signal.

The state of bistable circuit 55 is changed upon the occurrence of the trailing edge of each encoded pulse so that the polarity of the next encoded pulse is opposite that of its immediate predecessor. To accomplish this end the "0" output terminal of bistable circuit 49 is connected to one input terminal of an AND gate 65 whose other two input terminals have pulses or "1's" applied to them unless four consecutive "0's" occur in the encoded signal.

Thus, upon the occurrence of an output pulse, a "0" is present at the output terminal of AND gate 65 which output terminal is connected to one input terminal of OR-NOT gate 66. The second input terminal of OR-NOT gate 66 is connected to output terminal 17 of source 15 where a pulse is generated at the end of a time slot so that after the occurrence of the trailing edge of the preceding encoded pulse OR-NOT gate 66 produces a "1" at its output terminal which causes bistable circuit 55 to change state. Thus, the next occurring pulse will produce a "0" output from the one of AND-NOT gates 56 and 57 which previously had a pulse at its output. As a result pulses are alternately generated at the output terminals of AND-NOT gates 60 and 61 in response to unipolar input pulses. The output terminals of AND-NOT gates 60 and 61 are connected to opposite ends of the center tapped primary winding of a transformer 62 so that the pulses generated by these gates appear at the output terminals of the secondary winding as pulses of opposite polarity.

Thus, in the absence of a string of four or more consecutive "0's," the state of bistable circuit 55 determines which of AND-NOT gates 60 and 61 produces an output signal. The state of bistable circuit 55 is in turn governed by OR-NOT gate 66 which produces an output signal upon the occurrence of each trailing edge of an output pulse. The portion of FIG. 1 thus far described will be seen to comprise a circuit for transforming unipolar pulse signals into bipolar signals.

It will be recalled that in accordance with this invention, the presence of four consecutive "0's" in the unipolar pulse signal (and thus, too, in the bipolar signal) is detected in order to activate apparatus to delete those "0's" and substitute the proper predetermined bipolar code word. Toward this end individual input terminals of an AND-NOT gate 70 are respectively connected to the "0" output terminals of bistable circuits 45 through 48. Thus, when four consecutive "0's" are stored in bistable circuits 45 through 48, as indicated by a "1," or reference voltage, at the "0" output terminal of each, AND-NOT gate 70 generates a "0" output signal. This signal is inverted by an OR-NOT gate 71, due to the fact that, as explained below, the other input terminal of OR-NOT gate 71 normally has a "0" input signal present thereon, and is then applied through an AND gate 31 to the set input terminal of a first of four bistable circuits 75, 76, 77, and 78. The output of OR-NOT gate 71 is also inverted by inverted circuit 80 and applied through AND gate 30 to the reset input terminal of bistable circuit 75. Thus, in response to the presence of four consecutive "0's" in bistable circuits 45 through 48, normally reset bistable circuit 75 is set and a "0" or a ground voltage appears at its "0" output terminal.

The "0" output terminal of bistable circuit 75 is connected to one input terminal of AND-NOT gate 83 which, in response thereto, generates a "1" output signal at its output terminal which is in turn connected to the second input terminal of OR-NOT gate 71. The presence of a "1" at the input terminal of OR-NOT gate 71 prevents OR-NOT gate 71 from generating another output pulse. Similar inhibiting signals are obtained from the "0" output terminals of bistable circuits 76 and 77 which are connected to the second and third input terminals of AND-NOT gate 83. As a result, the output "0" produced by AND-NOT gate 70 in response to the absence of the four unipolar input "0's" is read sequentially through bistable circuits 75 through 78 under the control of the clock signals and AND gates 33, 35, and 37 which respectively interconnect the "1" output of one bistable circuit to the "set input of the next. During this time OR-NOT gate 71 is inhibited to prevent the setting of bistable circuit 75 in response to the reception of consecutive unipolar "0's" in the next three time slots immediately following the first four consecutive unipolar "0's," so that bistable circuit 75 is set upon the detection of four consecutive "0's," reset in the next time slot, by the "0" output of OR-NOT gate 71 inverted by inverter 80, and cannot be set again until another four consecutive "0's" have been detected.

As the "1" indicating four consecutive "0's" is read through bistable circuits 75 through 78, the apparatus functions to generate one or the other of two special bipolar code words in accordance with the rules discussed above. If the encoded pulse immediately preceding the four "0's" was encoded as a negative going pulse or "−," then the four consecutive "0's" are encoded as a bipolar word "++−−." On the other hand, if the preceding pulse was encoded as a positive pulse, or "+," then the four consecutive "0's" are encoded as the bipolar code word "−−++." To accomplish the generation of the appropriate bipolar word, the "0" output terminal of each of the bistable circuits 75 through 78 is connected to one input terminal of an AND-NOT gate 85 so that AND-NOT gate 85 produces four consecutive "1's" at its output terminal during the four time slots occupied by the four consecutive "0's." The output signal from AND-NOT gate 85 is in turn applied to one input terminal of each of two AND-NOT gates 87 and 88. A second input terminal of each of the AND-NOT gates 87 and 88 is connected to receive the clock pulses at output terminal 16 of source 15. In addition, the third input terminal of AND-NOT gate 87 is connected to the "0" output terminal of bistable circuit 55 while the third input terminal of AND-NOT gate 88 is connected to the "1" output terminal of bistable circuit 55. When bistable circuit 76 is set in response to the pulse generated by OR-NOT gate 71 and transferred through bistable circuit 75, a "0" is applied to one of the input terminals of AND gate 65 so that upon the occurrence of the next complementary clock signal present at terminal 17 of source 15 bistable circuit 55 changes state.

Since the output terminal of AND-NOT gate 87 is connected to one input terminal of AND-NOT gate 61 and the output terminal of AND-NOT gate 88 is connected to one input terminal of AND-NOT gate 60, the result is that the pulse appearing at the output of transformer 62 is opposite in polarity to the preceding encoded pulse. The state of bistable circuit 55 is maintained until bistable circuit 78 generates an output pulse so that the first two pulses of the substituted bipolar pulse word are opposite in polarity to the immediately preceding pulse while the last two pulses are the same as the immediately preceding pulse. The presence of bistable circuit 49 provides a one time slot interval in which to recognize that four consecutive "0's" have occurred and provides time for the apparatus to perform the above described operations.

Figure 2:
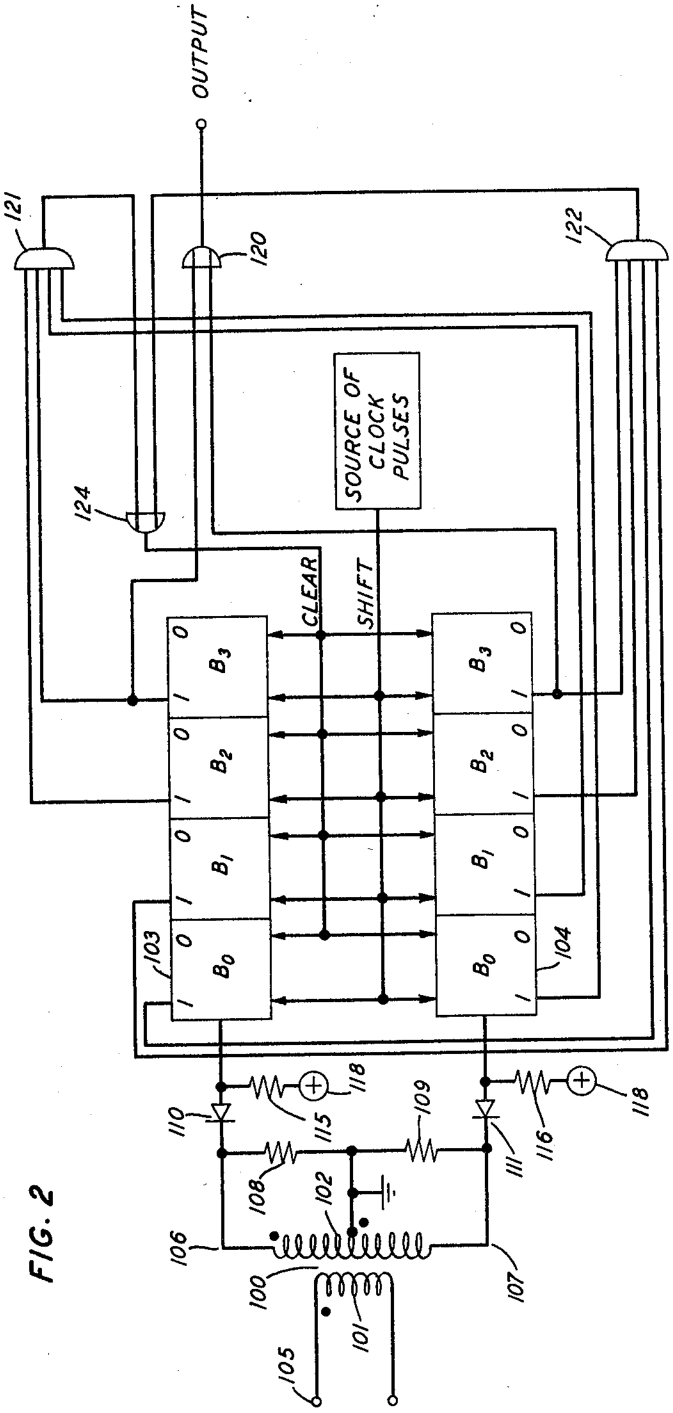
FIG. 2 is a block diagram of a decoder embodying the invention.

A decoder embodying this invention and arranged to convert the transmitted bipolar signals to unipolar signals while deleting any bipolar code words transmitted in place of four consecutive "0's" from the signal is shown in FIG. 2. A transformer 100 having a primary winding 101 and a center tapped secondary winding 102 and having the polarities indicated by the polarity dot markings is provided with associated circuitry as a means of separating the positive and negative bipolar pulses for application to two shift registers 103 and 104. As indicated by the polarity of the transformer windings, when a positive pulse is received at the upper terminal 105 of the primary winding 101 a positive pulse is generated at the upper terminal 106 of secondary winding 102 and a negative pulse at the lower terminal 107 of secondary winding 102. Similarly, a received negative bipolar pulse causes a positive pulse to be generated at the lower terminal 107 of secondary winding 102 and a negative pulse at the upper terminal 106. Connected in series between the upper and lower terminals 106 and 107 of secondary winding 102 are two resistors 108 and 109 whose junction is connected to the center tap of winding 102 and to ground. In addition, two diodes 110 and 111 have their cathodes connected to terminals 106 and 107, respectively, while their anodes are connected by means of resistors 115 and 116 to a source of positive voltage 118. As a result of this configuration, diodes 110 and 111 are normally forward biased but when a positive pulse appears at terminal 106, diode 110 is back biased and a positive voltage is then applied to the input of shift register 103. Similarly, when a negative pulse is received, diode 111 is back biased and a positive voltage is applied to the input of shift register 104. As a result, in response to the reception of a positive bipolar pulse a pulse is inserted in shift register 103, while in response to the reception of a negative bipolar pulse a pulse is inserted in shift register 104.

Each shift register contains four binary stages, $B_0$ through $B_3$, each of which has a "1" and a "0" output terminal so that when a pulse is stored in a stage a positive voltage appears at the "1" output terminal and a ground voltage at the "0" output terminal. Conversely, when a "0" is stored in a stage a positive voltage appears at the "0" output terminal and a ground voltage at the "1" output terminal. In addition, each stage has a "clear" input terminal to which an applied voltage causes the stage to clear, or assume the condition of having a "0" stored therein. Finally, each stage has a shift input terminal connected to receive clock pulses during each time slot from a source of clock pulses 108 so that the state of one stage is shifted to the next stage during each time slot.

The output signals presnt at the "1" output terminal of the last stage, $B_3$, of each of registers 103 and 104 represent in unipolar form the bipolar transmitted signal. The "1" output terminal of each of the last stages is connected to OR gate 120 at whose output terminal the unipolar signal is obtained.

To eliminate the bipolar pulse code words substituted at the encoder in place of four consecutive unipolar "0's," the apparatus must recognize the occurrence of these words in the input signal. In particular, the reception of two positive bipolar pulses followed in the two succeeding time slots by two negative pulses must be recognized as the substituted word "++−−." Similarly, the two violations which constitute the substituted bipolar word "−−++" must be recognized. Toward recognition of these words two AND gates 121 and 122 are provided.

AND gate 121 has two of its input terminals connected to the "1" output terminals of the last two stages, $B_3$ and $B_2$, of shift register 103 while its other two input terminals are connected to the "1" output terminals of stages $B_0$ and $B_1$ of shift register 104. In response to the reception of the bipolar pulse code word "++−−" reference voltages appear at all the input terminals of AND gate 121 so that it is enabled and its output signal applied through an OR gate 124 to clear all the stages of both shift registers 103 and 104. As a result and in accordance with this invention the next four bits read out of the shift registers will be "0's" and the substituted bipolar pulse code word is deleted. Similarly, in response to the reception of the bipolar pulse code word "−−++," AND gate 122, whose four input terminals are respectively connected to the "1" output terminals of stages $B_3$ and $B_2$ of shift register 104 and "1" output terminals of stages $B_0$ and $B_1$ of register 103, is enabled to generate a signal which is transmitted through OR gate 124 to clear the shift register. Thus, in accordance with his invention the next four bits are read out of the shift register as four consecutive "0's" with the bipolar pulse code word "−−++" deleted.

Figure 3A:
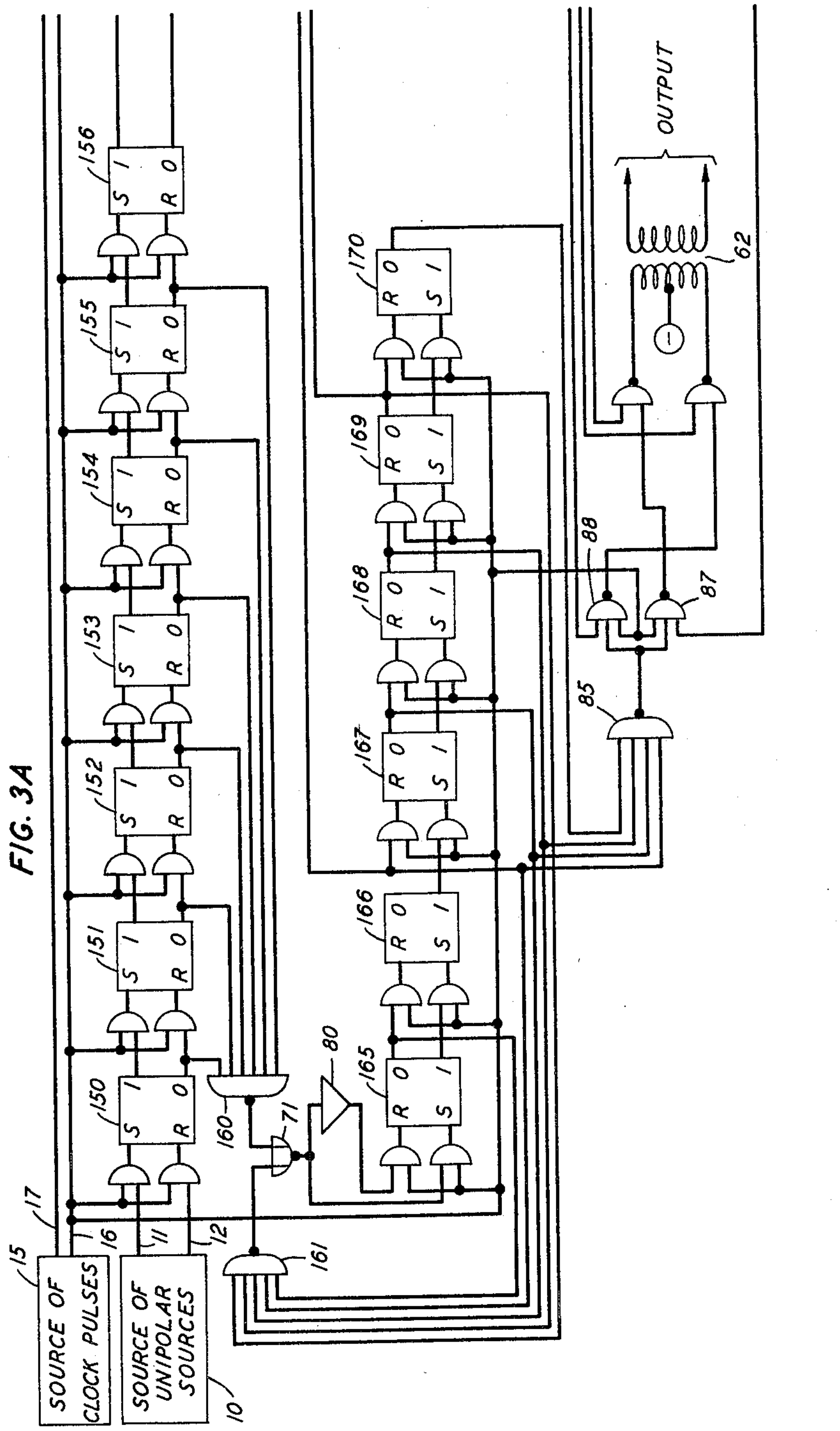
FIGS. 3A and 3B taken together are a block diagram of encoding apparatus embodying this invention in which the number of transmitted spaces or "0's" is limited to five.
Figure 3B:
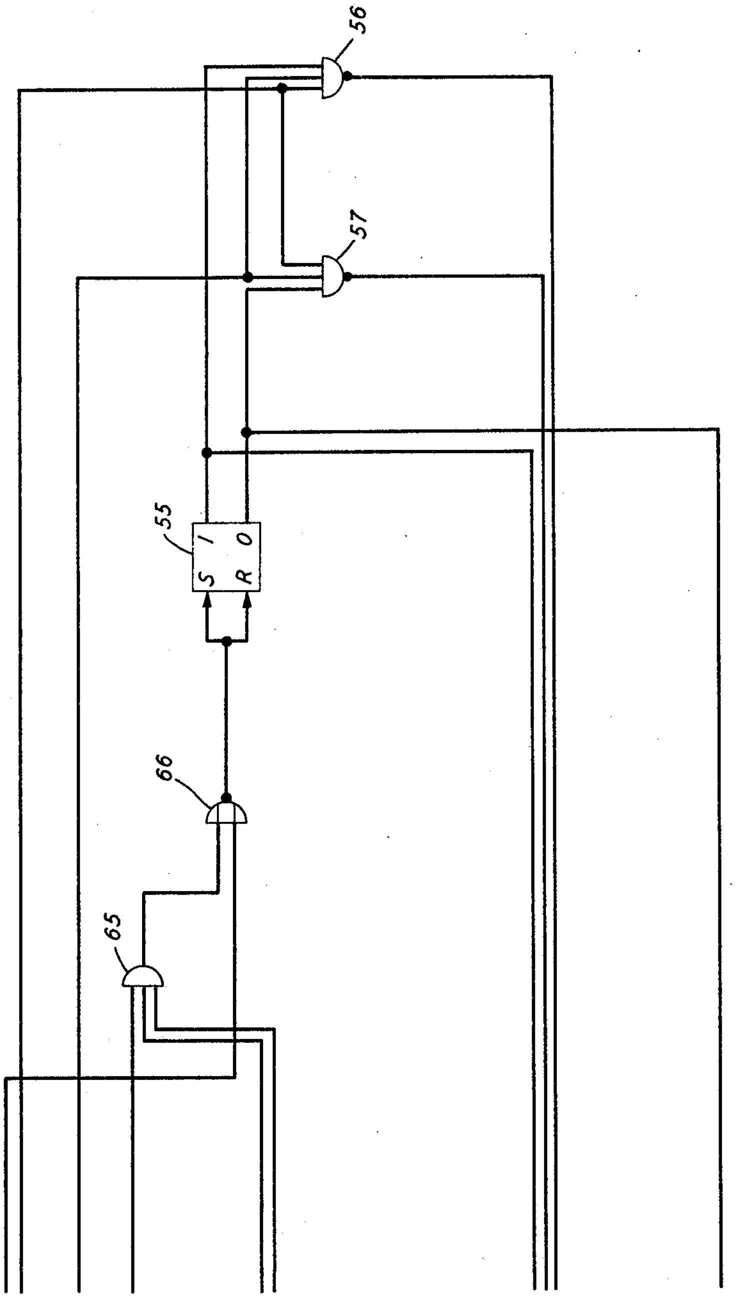

FIGS. 3A and 3B, taken together with FIG. 3A to the left of FIG. 3B, comprise a logic diagram of apparatus embodying this invention and arranged for converting unipolar pulses into bipolar pulses in which each pulse is transmitted as a pulse opposite in polarity to the immediately preceding pulse and each "0" is transmitted as a "0" but the number of consecutive "0's" is limited to five. When the number of consecutive "0's" is six, either of two bipolar pulse words is transmitted in their place, depending upon the polarity of the last pulse transmitted.

When the last pulse transmitted prior to the occurrence of the six consecutive "0's" was a positive pulse, then the bipolar word "0+−0−+" is transmitted in place of the six "0's." Similarly, when the last pulse was a negative pulse, then the bipolar word "0−+0+−" is substituted for the six "0's." When twelve consecutive "0's" occur, the first six are replaced in accordance with the above rules and the second group of six consecutive "0's" is replaced by the same bipolar words. The replacement words result in a bipolar violation between the second digit of the replacement word and the last preceding pulse generated. In addition, there is a bipolar violation between the third and fifth digits of the replacement word. In accordance with the invention these bipolar violations are recognized at the receiving terminal and are used to delete the replacement words.

The apparatus shown in FIGS. 3A and 3B represents in almost all respects an extension of the apparatus shown in FIG. 1, the extension being necessary to accommodate the recognition of six consecutive "0's." As a result, instead of employing a storage bank of five binary circuits to receive the unipolar pulses from source 10, seven binary circuits 150 through 156 are employed. In addition, a six input terminal AND-NOT gate 160 is employed instead of the four input terminal AND-NOT gate 70, a five input terminal AND-NOT gate 161 is employed instead of a three input terminal AND-NOT gate 83, and AND gate 65 which generates pulses to trigger bistable circuit 55 has one of its input terminals connected to the "0" output terminal of the second of a series of binary circuits 165 through 170 while the third input terminal is connected to the "0" output terminal of the fifth binary circuit 169. The result of this configuration together with the fact that only the "0" output terminals of binary circuits 166, 167, 169, and 170 are connected to the input of AND-NOT gate 85 is that the first and fourth bits of each bipolar replacement code word are "0's" and the second bit represents a bipolar violation of the rules when compared with the last encoded pulse. In addition, since no output is provided from the zero output terminals of binary circuits 167 and 168 to AND gate 65, the bistable circuit 55 does not change state between the third and fifth digits of the replacement binary word and as a result there is a bipolar violation between the third and fifth digits. In all other respects the circuit shown in FIGS. 3A and 3B is identical to that shown in FIG. 1 and corresponding elements in these two drawings share the same reference numerals.

Figure 4:
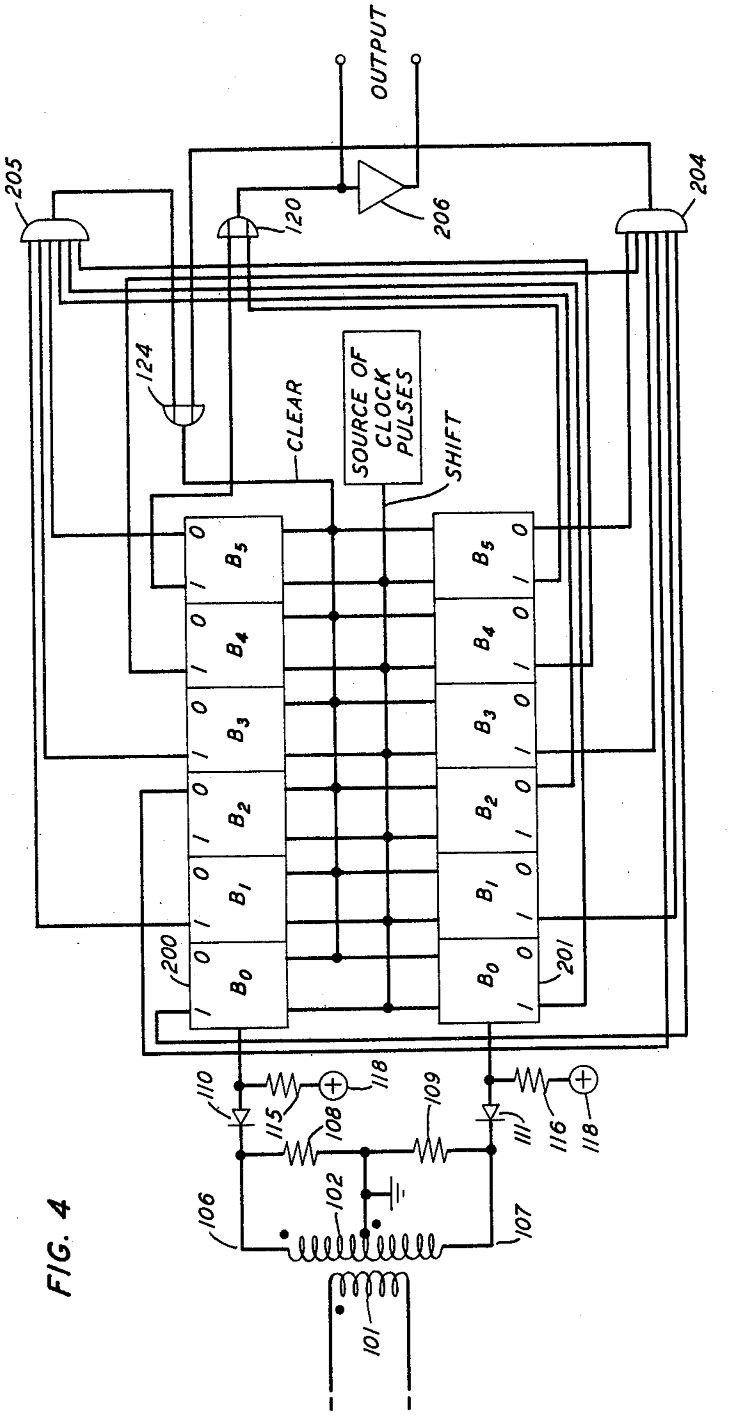
FIG. 4 is a block diagram of a decoder embodying the invention for use in a transmission system employing the encoding apparatus shown in FIGS. 3A and 3B.

The decoding apparatus shown in FIG. 4 represents in almost all respects a straightforward extension of the apparatus shown in FIG. 2, the extension being necessary to accommodate the recognition of six consecutive "0's." Instead of employing shift registers having four binary circuit stages as shown in FIG. 2, two shift registers 200 and 201 are employed, each of which has six binary circuits $B_0$ through $B_5$. In addition, two six input AND gates 204 and 205 are connected to the output terminals of the shift registers in such a manner that AND gate 204 generates an output signal whenever the bipolar word "0+−0−+" is received and AND gate 205 generates an output signal whenever the bipolar word "0−+0+−" is received.

Toward this end, the six input AND gate 204 has one of its input terminals connected to the "0" output terminal of stage $B_5$ of register 201, a second input terminal connected to the "1" output terminal of stage $B_4$ of shift register 200, a third input terminal connected to the "1" output terminal of stage $B_3$ of register 201, a fourth input terminal connected to the "0" output terminal of stage $B_2$ of register 200, a fifth input terminal connected to the "1" output terminal of stage $B_1$ of register 201, and the sixth input terminal connected to the "1" output terminal of stage $B_0$ of register 200. When the bipolar word "0+−0−+" has been received, a reference voltage, or "1," is generated at each of these output terminals and AND gate 204 generates an output signal which is transmitted through OR gate 124 to clear each of the shift registers so that for the next six bits "0" output signals are present at the "1" output terminal of the $B_5$ stage of each shift register so that "0's" are transmitted therefrom through OR gate 120 to the output terminal. A complementary output signal is obtained by inverting the output of OR gate 120 through the use of inverting amplifier 206.

To recognize the bipolar word "0−+0+−," AND gate 205 has one of its input terminals connected to the "0" output terminal of stage $B_5$ of register 200, a second input terminal connected to the "1" output terminal of stage $B_4$ of register 201, a third input terminal connected to the "1" output terminal of stage $B_3$ of register 200, a fourth input terminal connected to the "0" output terminal of stage $B_2$ of register 201, a fifth input terminal connected to the "1" output terminal of stage $B_1$ of register 200, and the sixth input terminal connected to the "1" output terminal of stage $B_0$ of shift register 201. When the bipolar word "0−+0+−" has been received, a reference voltage is generated at each of these output terminals, enabling AND gate 205 so that it generates an output signal which is transmitted through OR gate 124 to clear the shift registers so that "0's" are read out of the six registers during the next six time slots. In all other respects, the circuit shown in FIG. 4 is identical to that shown in FIG. 2 and like reference numerals have been employed to designate corresponding apparatus.

Figure 5:
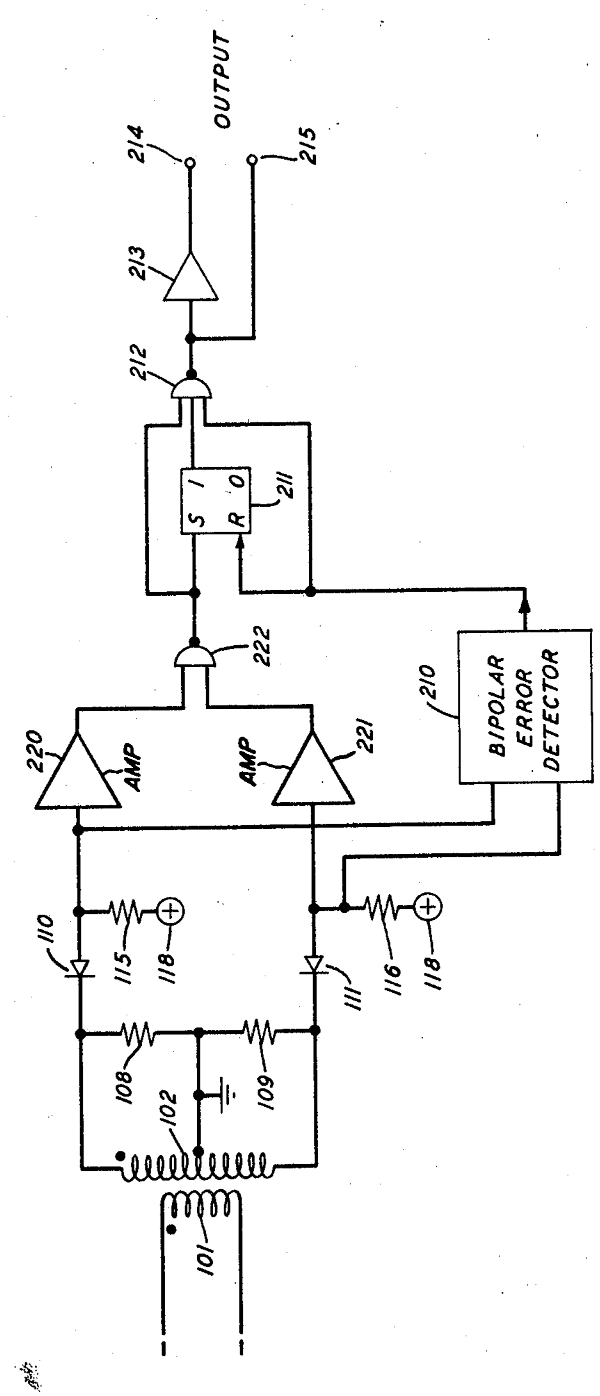
FIG. 5 is a decoder embodying this invention which may be used with either the encoder shown in FIG. 1 or that shown in FIG. 3.

An alternative form of decoder for decoding the signals encoded by the apparatus shown in FIG. 1 or 3 is illustrated in the logic diagram form of FIG. 5. A pulse separating circuit identical to that employed in FIGS. 2 and 4 is used to separate positive and negative going pulses so that a positive pulse appears at the anode of diode 110 whenever a positive pulse is received, and a positive pulse is generated at the anode of diode 111 whenever a negative pulse is received. These pulses are applied to a bipolar error detector 210 such as that shown in Fig. 42, page 77, of J. S. Mayo's paper, "A Bipolar Repeater for Pulse Code Modulation Signals," published in the June 1962 issue of the Bell System Technical Journal. Such an error detector normally produces a positive output voltage but generates a ground voltage when a violation is detected. Thus the error detector may be regarded as producing a "0" output signal upon the occurrence of a bipolar violation and a "1" output signal in the absence of such violations. The output of the bipolar error detector 210 is applied to the reset input terminal of a bistable circuit 211 and also to one input terminal of a three input terminal AND-NOT gate 212. The function of the output signal from the bipolar error detector is to cause AND-NOT gate 212 to generate a "1" output signal whenever an error is detected so that a "0" is generated at the output of inverting amplifier 213 which is connected to receive the output signals from AND-NOT gate 212. Thus, whenever an error is detected, a "0" is generated at output terminal 214 and a complementary output signal or "1" at output terminal 215, which is directly connected to the output terminal of AND-NOT gate 212. In addition, the output signal from the bipolar error detector resets bistable circuit 211 so that the AND-NOT gate 212, which is connected to receive the signal at the "1" output terminal of bistable circuit 211 also produces a "1" output during the succeeding time slot. As a result every time an error is detected the output signal from the bipolar error detector causes two consecutive "0's" to be generated at output terminal 214 and two consecutive "1's" at the complementary output terminal 215.

Normally, in the absence of inserted violations, the signals at the anodes of diodes 110 and 111 are inverted by inverting amplifiers 220 and 221, respectively, and applied to the input of an AND-NOT gate 222. Since at least one of the input signals applied to AND-NOT gate 222 must be a "1" when a pulse is received, the effect is that AND-NOT gate 222 generates a "0" in response to the reception of a transmitted "0" and a pulse output signal or "1" in response to the reception of either a positive or a negative going transmitted pulse. Specifically, if the input signal is a "0," then "1" input signals appear at both input terminals of AND-NOT gate 222 which in response thereto produces a "0" output signal. AND-NOT gate 212 in turn produces a "1" output signal which is inverted by inverting amplifier 213 so that a "0" output signal appears at terminal 214 in the absence of the detection of a bipolar violation. Thus "0's" less than six in consecutive number are reproduced as "0's." When a pulse is received AND-NOT gate 222 generates a "1" output signal which sets the bistable circuit 211 so that the three signals applied to AND-NOT gate 212 are each "1's" and AND-NOT gate 212 generates a "0" output in response thereto. This is inverted by inverting amplifier 213 so that a pulse is generated at output terminal 214 and a space at the complementary output terminal 215. Thus, in response to the reception of a positive or a negative going pulse in the absence of bipolar violations a unipolar output pulse is generated at terminal 214.

Thus, in accordance with the invention unipolar pulse signals are encoded in accordance with the conventional bipolar pulse code wherein each pulse is transmitted as a pluse opposite in polarity to the immediately preceding pulse and each space is transmitted as a space. When a number of consective "0's" exceeding a predetermined number are to be encoded they are replaced by one of two predetermined bipolar words in accordance with the polarity of the last encoded pulse which results in a violation of the bipolar code. The predetermined bipolar words have a zero direct current level as does the rest of the encoded signal which facilitates pulse regeneration, and contains pulses so that timing information is noit lost.

It is to be understood that the above-described arrangements are illustrative of the appllcation of the principles of the invention. Numerous other arrangements may be devised by those skilled in the art without departing from the spirit and scope of the invention.

What is claimed is:

1. Apparatus for converting binary pulse signals consisting of positive pulses and spaces into three state signals of positive pulses, negative pulses and spaces comprising, in combination, means to store a predetermined number of said binary pulse signals, means to encode said stored binary pulse signals wherein each positive pulse of the binary signal is encoded as a pulse whose polarity is opposite that of the immediately preceding encoded pulse, means to determine when said storage means contains a predeterined number of consecutive spaces and to encode such a train of spaces as a predetermined pulse signal containing consecutive pulses of the same polarity, and means to encode stored spaces less than said predetermined number as spaces.

2. Apparatus for converting binary pulse signals consisting of positive pulses and spaces into three state signals of positive pulses, negative pulses and spaces comprising, in combination, means to store a predetermined number of said binary pulse signals, means to encode said stored binary pulse signals wherein each positive pulse of the binary signal is encoded as a pulse whose polarity is opposite that of the immediately preceding encoded pulse, means to determine when said storage means contains a predetermined number of consecutive spaces, means responsive to said determination means to encode such a train of spaces as a first predetermined pulse word when the last encoded stored pulse was encoded as a positive pulse, means responsive to said determination means to encode such a train of spaces as a second predetermined pulse word when the last encoded stored pulse was encoded as a negative pulse, said first and second pulse words containing pulses such that the resulting encoded pulse trains contain successive pulses of the same plurality, and means to encode stored spaces less than said predetermined number as spaces.

3. Apparatus for converting binary pulse signals consisting of positive pulses and spaces into three state signals of positive pulses, negative pulses and spaces, comprising, in combination, means to store four of said binary pulse signals, means to encode said stored binary pulse signals wherein each positive pulse of the binary signal is encoded as a pulse whose polarity is opposite that of the immediately preceding encoded pulse, means to determine when said storage means contains four spaces, means responsive to said determination means to encode such a train of spaces as the pulse word "−−++" when the last encoded stored pulse was encoded as a positive pulse where a "+" indicates a positive pulse and a "−" indicates a negative pulse, means responsive to said determination means to encode such a train of spaces as the pulse word "++−−" when the last encoded stored pulse was encoded as a negative pulse where a "+" indicates a positive pulse and a "−" a negative pulse, and means to encode stored spaces less than four in consecutive number as spaces.

4. Apparatus for converting binary pulse signals consisting of positive pulses and spaces into three state signals of positive pulses, negative pulses and spaces comprising, in combination, means to store six of said binary pulse signals, means to encode said stored binary pulse signals wherein each positive pulse of the binary signal is encoded as a pulse where polarity is opposite that of the immediately preceding encoded pulse, means to determine when said storage means contains six spaces, means responsive to said determination means to encode such a train of spaces as the pulse word "0+−0−+" when the last encoded stored pulse was encoded as a positive pulse where a "+" indicates a positive pulse, a "−" indicates a negative pulse and a "0" indicates a space, means to etncode such a train of spaces as the pulse word "0−+0+−" when the last encoded stored pulse was encoded as a negative pulse, where a "+" indicates a positive pulse, a "−" a negative pulse, and a "0" a space, and means to encode stored binary spaces less than six in consecutive number as spaces.

5. Apparatus for converting three state signals of positive pulses, negative pulses and spaces, which signals have two constituents, a first of which has no two consecutive pulses of the same polarity and the second of which comprises pulse words of a predetermined number of pulse signals having pulses of such polarity that the resulting pulse signal has one or more consecutive pulses of the same polarity, into binary pulses consisting of positive pulses and spaces, comprising, in combination, separating means to separate said positive and said negative pulses of said three state signal so that a pulse is generated at one terminal of said separating means in response to the reception of a positive pulse and a pulse is generated at a second terminal of said separating means in response to the reception of a negative pulse, a circuit output terminal, means connecting said pulse separating means to said circuit output terminal, means connected to said separating means to recognize said second constituent of said three state signal, and means to inhibit said means connecting said pulse separating means and said circuit output terminal from transmitting pulses to said circuit output terminal when said recognition means recognizes said second constituent of said three state signal.

6. Apparatus in accordance with claim 5 wherein said means connecting said pulse separating means to said circuit output terminal, said recognition means, and said inhibiting means comprises, in combination, a pair of shift registers each having at least an input terminal connected to said pulse separating means, an output terminal connected to said circuit output terminal, a plurality of binary stages equal to said predetermined number of pulse signals in said second constituent, each such stage having two terminals at which voltages indicate the state of the binary stage, and a clear terminal at which an input signal causes all of said binary stages to indicate the storage of a space, two AND gates each having an input terminal connected to at least one terminal of a binary stage in each shift register so that each AND gate is enabled upon the presence in said shift registers of said second constituent of said three state signal, and an OR gate having its input terminals connected to the output terminals of said AND gates and its output terminal connected to said clear terminal of said shift registers.

7. Apparatus in accordance with claim 5 wherein said means connecting said pulse separating means to said circuit output terminal, said recognition means and said inhibiting means comprises, in combination, a first AND-NOT gate having two input terminals connected one to each of two terminals of said pulse separating means and an output terminal, a bipolar error detector connected to receive positive and negative pulses and generate a space whenever two consecutive pulses are generated at the same terminal of said pulse separation means, a bistable circuit having at least a set terminal, a reset terminal, and an output terminal at which a pulse is present when said bistable circuit is in the set condition, means connecting said output terminal of said first AND- NOT gate to said set terminal of said bistable circuit so that said bistable circuit is set whenever an input pulse is received, a second AND-NOT gate having three input terminals, a first of which is connected to said output terminal of said bistable circuit, the second of which is connected to the output of said first AND-NOT gate and the third of which is connected to the output of said bipolar error detector, means connecting the output of said bipolar error detector to said reset terminal of said bistable circuit so that said bistable circuit is reset each time an error is detected and said second AND-NOT gate is caused to generate a pulse for two time slots, and phase inversion means connected to the output of said second AND-NOT gate.

References Cited

UNITED STATES PATENTS 2,957,947 10/1960 Bowers ------------- 325—38

ROBERT L. GRIFFIN, Primary Examiner

JAMES A. BRODSKY, Assistant Examiner

U.S. Cl. X.R.

325—38, 141, 321